(12) United States Patent
Da Palma et al.

(10) Patent No.: US 7,996,229 B2
(45) Date of Patent: Aug. 9, 2011

(54) SYSTEM AND METHOD FOR CREATING AND POSTING VOICE-BASED WEB 2.0 ENTRIES VIA A TELEPHONE INTERFACE

(75) Inventors: William V. Da Palma, Coconut Creek, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 11/766,335

(22) Filed: Jun. 21, 2007

(65) Prior Publication Data

US 2008/0319742 A1   Dec. 25, 2008

Related U.S. Application Data

(63) Continuation-in-part of application No. 11/765,900, filed on Jun. 20, 2007, and a continuation-in-part of application No. 11/765,928, filed on Jun. 20, 2007, and a continuation-in-part of application No. 11/765,962, filed on Jun. 2, 2007.

(51) Int. Cl.
*G10L 21/00* (2006.01)
*G06F 17/24* (2006.01)

(52) U.S. Cl. .................... 704/270.1; 715/201

(58) Field of Classification Search .............. 704/270, 704/270.1; 715/201, 234, 700, 738
See application file for complete search history.

(56) References Cited

U.S. PATENT DOCUMENTS

| | | | |
|---|---|---|---|
| 6,314,402 B1 | 11/2001 | Monaco et al. |
| 6,324,511 B1 | 11/2001 | Kiraly et al. |
| 6,442,577 B1 | 8/2002 | Britton et al. |
| 6,636,831 B1 | 10/2003 | Profit, Jr. et al. |
| 6,801,604 B2 | 10/2004 | Maes et al. |
| 6,865,599 B2 | 3/2005 | Zhang |
| 7,143,148 B1 | 11/2006 | Hickman et al. |
| 7,334,050 B2 | 2/2008 | Zondervan et al. |
| 7,581,166 B2 | 8/2009 | Renger et al. |
| 7,631,104 B2 | 12/2009 | Da Palma et al. |
| 7,673,017 B2 | 3/2010 | Kim et al. |
| 2002/0010756 A1 | 1/2002 | Oku |

(Continued)

FOREIGN PATENT DOCUMENTS

WO   2005011921   12/2005

OTHER PUBLICATIONS

Leseney, T., "Push-to-blog", Siemens AG, Oct. 2004.

(Continued)

*Primary Examiner* — Abul Azad
(74) *Attorney, Agent, or Firm* — Patents on Demand, P.A.; Brian K. Buchheit; Scott M. Garrett

(57) ABSTRACT

The present invention discloses a system and method for creating, editing, and posting a BLOG or a WIKI using a telephone. In the invention, a voice-based, real-time telephone communication can be established between a user and a voice response system. User speech can be received over the communication. The user speech can be speech-to-text converted to produce text. The text can be added to a BLOG or a WIKI, which can be posted to a server. The telephone communication can be terminated. The newly posted BLOG or WIKI can be served by the server to clients.

17 Claims, 3 Drawing Sheets

U.S. PATENT DOCUMENTS

| | | | |
|---|---|---|---|
| 2002/0052747 A1 | 5/2002 | Sarukkai | |
| 2003/0055884 A1 | 3/2003 | Yuen et al. | |
| 2003/0088421 A1 | 5/2003 | Maes et al. | |
| 2003/0139928 A1 | 7/2003 | Krupatkin et al. | |
| 2003/0177010 A1 | 9/2003 | Locke | |
| 2005/0132056 A1 | 6/2005 | Creamer et al. | |
| 2006/0004700 A1 | 1/2006 | Spivak et al. | |
| 2006/0015335 A1 | 1/2006 | Vennelakanti et al. | |
| 2006/0195328 A1 | 8/2006 | Abraham et al. | |
| 2007/0078884 A1 | 4/2007 | Ott et al. | |
| 2008/0034056 A1* | 2/2008 | Renger et al. | 709/217 |
| 2008/0086689 A1 | 4/2008 | Berkley et al. | |
| 2008/0242221 A1 | 10/2008 | Shapiro et al. | |
| 2008/0250108 A1* | 10/2008 | Levy | 709/206 |
| 2008/0319757 A1 | 12/2008 | Da Palma et al. | |
| 2008/0319758 A1 | 12/2008 | Da Palma et al. | |
| 2008/0319759 A1 | 12/2008 | Da Palma et al. | |
| 2008/0319760 A1 | 12/2008 | Da Palma et al. | |
| 2008/0319761 A1 | 12/2008 | Da Palma et al. | |
| 2008/0319762 A1 | 12/2008 | Da Palma et al. | |
| 2008/0320079 A1 | 12/2008 | Da Palma et al. | |
| 2008/0320443 A1 | 12/2008 | Da Palma et al. | |

OTHER PUBLICATIONS

DeMaria, M.J., "Searching For the Right Words", Network Computing, vol. 17, No. 22, pp. 26, 28, Oct. 26, 2006.

Fielding, R., et al., "Hypertext Transfer Protocol—HTTP/1.1," [online] Internet RFC 2616, The Internet Society, 1999, [retrieved Jul. 22, 2009] retrieved from the Internet: <http://www.w3.org/Protocols/rfc2616/rfc2616.html>.

O'Reilly, T., "What is Web 2.0," [online] O'Reilly Network, Sep. 30, 2005, [retrieved Nov. 25, 2008] retrieved from the Internet <http://www.oreillynet.com/pub/a/oreilly/tim/news/2005/09/30/what-is-web-20.html>.

"Bliki", [online] Wikipedia [retrieved Feb. 23, 2007] retrieved from the Internet: <http://en.wikipedia.org/wiki/Bliki>.

"Cyn.in," [online] Cynapse [retrieved Feb. 23, 2007] retrieved from the Internet: <http://www.cynapse.com/cynin>.

Capra III, R.G., et al., "Mobile refinding of web information using a voice interface: an exploratory study", Proc. of 2005 Latin American Conf. on Human-computer interaction, Cuernavaca, Mexico, pp. 88-99, 2005.

"Enterprise Bliki," [online] Wikipedia, [retrieved Feb. 23, 2007] retrieved from the Internet: http://en.wikipedia.org/wiki/Enterprise_bliki>.

Fielding, R., et al., "Principled Design of the Modern Web Architecture," ACM Trans. on Internet Technology, vol. 2, No. 2, May 2002, pp. 115-150.

Kolias, et al., "A Pervasive Wiki Application Based on VoiceXML," ACM, PETRA '08, Jul. 15-19, 2008.

Chang, S.E., et al., "The implementation of a secure and pervasive multimodal Web system architecture", Inf. and Software Tech., vol. 48, No. 6, pp. 424-432, Jun. 2006.

Nottingham, M., et al., "Request for Comments (RFC) 4287: The Atom Syndication Format," The Internet Society, Dec. 2005, 43 pages.

Schaffert, et al., "IkeWiki: A Semantic Wiki for Collaborative Knowledge Management,"IEEE Int'l. Workshops on Enabling Technologies: Infrastructure for Collaborative Enterprises, 2006.

"SuiteTwo: Features", [online] Moveable Type, 2006 [retrieved Feb. 23, 2007] retrieved from the Internet: < http://suitetwo.com/features>.

Takami, et al., "A Study on the Architecture and Voice Dialog Scheme for a Personal Web Service in a Ubiquitous Communication Environment," IEEE, pp. 398-401, Jun. 2006.

"Wiki," [online] Wikipedia [retrieved Feb. 23, 2007] retrieved from the Internet: <http://en.wikipedia.org/wiki/Wiki>.

US Patent No. 7631104, Notice of Allowance, Jul. 29, 2009.

US Pub. No. 20080319758, Office Action 1, Jun. 9, 2010.

US Pub. No. 20080319762, Office Action 1, Jun. 11, 2010.

US Pub. No. 20080319760, Office Action 1, Jul. 12, 2010.

US Pub. No. 20080320079, Office Action 1, Jun. 30, 2010.

Freier, J., et al., "WebViews: Accessing Personalized Web Content and Services", Proc. of 10th Int'l. Conf. on WWW, Hong Kong, pp. 576-586, 2001.

Goose, S., et al., "Streaming speech3: a framework for generating and streaming 3D text-to-speech and audio presentations to wireless PDAs as specified using extensions to SMIL", Proc. of 11th Intl. Conf. On WWW, Honolulu, HI, pp. 37-44, 2002.

Huang, C.M., et al., "Phone-Web: Accessing WWW using a telephone set", World Wide Web, vol. 2, No. 3, pp. 161-178, 1999.

Jieun, P., et al., "Conversational browser for accessing VoiceXML-based IVR services via multi-modal interactions on mobile devices", WSEAS Trans. on Computers, vol. 3, No. 1, pp. 85-91, Jan. 2004.

Park, J., et al., "Conversational Browser for Accessing VoiceXML-Based IVR Services Via Multi-Modal Interactions on Mobile Devices," [online] WSEAS Transactions on Computers, 2004, retrieved from the Internet: <www.wseas.us/e-library/conferences/athens2003/papers/465-123.doc>.

* cited by examiner

SYSTEM AND METHOD FOR CREATING AND POSTING VOICE-BASED WEB 2.0 ENTRIES VIA A TELEPHONE INTERFACE

CROSS-REFERENCE TO RELATED APPLICATIONS

This continuation-in-part application claims the benefit of U.S. patent application Ser. No. 11/765,900 filed Jun. 20, 2007, the benefit of U.S. patent application Ser. No. 11/765,928 filed Jun. 20, 2007, and the benefit of U.S. patent application Ser. No. 11/765,962 filed Jun. 20, 2007, which are incorporated by reference herein.

BACKGROUND

1. Field of the Invention

The present invention relates to the field of BLOG and WIKI posting and, more particularly, to a system and method for posting to a BLOG or WIKI using a telephone.

2. Description of the Related Art

Web 2.0 refers to a cooperative Web in which end-users add value by providing content, as opposed to Web systems that unidirectionally provide information from an information provider to an information consumer. In other words, Web 2.0 refers to a readable, writable, and updateable Web. Updated information can be very important for successful Web 2.0 sites, which is especially true for BLOGs, which often have subscribers using Rich Site Summary (RSS) feeds to automatically receive content updates.

To illustrate the importance of information currency, BLOGs are often used to post current sports scores, news reports, and other time sensitive content. People working in media covering sports or breaking news events need to rapidly provide content updates, as the value of these updates diminishes rapidly over time. For major media outfits often having a large infrastructure of dedicated personnel, updating BLOGs can be a matter of allocating personnel to the task. This can be expensive, can induce transcription or interpretation errors, and can also result in noticeable processing delays. Streamlined media outfits, often consisting of single individuals or small groups, can have an even more difficult time updating time-sensitive content, which often depends upon a journalist manually updating a BLOG themselves. This can be problematic for non-technically savvy journalists and for journalists deployed to locations not convenient for Web communications.

That is, currently Web 2.0 users are restricted to using Graphical User Interface (GUI) based editors to create and edit content. For example, BLOG authors enter BLOG content via a BLOG editor accessible via a Web browser. Similarly, WIKI content providers utilize a WIKI editor from a Web browser to create and/or edit WIKI entries. It can often be impractical or highly inconvenient for a journalist on-site to utilize a GUI equipped and network-linked computing device. For example, use of a notebook computer from a sporting event to quickly update a BLOG associated with the sporting event can be problematic. Significant delays in posting sporting event updates, however, can result in sports fans acquiring desired scores from competing journalists. It would be highly advantageous to permit content providers to post BLOG and WIKI entries via a telephony communication channel. No known system or method permits telephone-based postings of BLOG or WIKI content.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
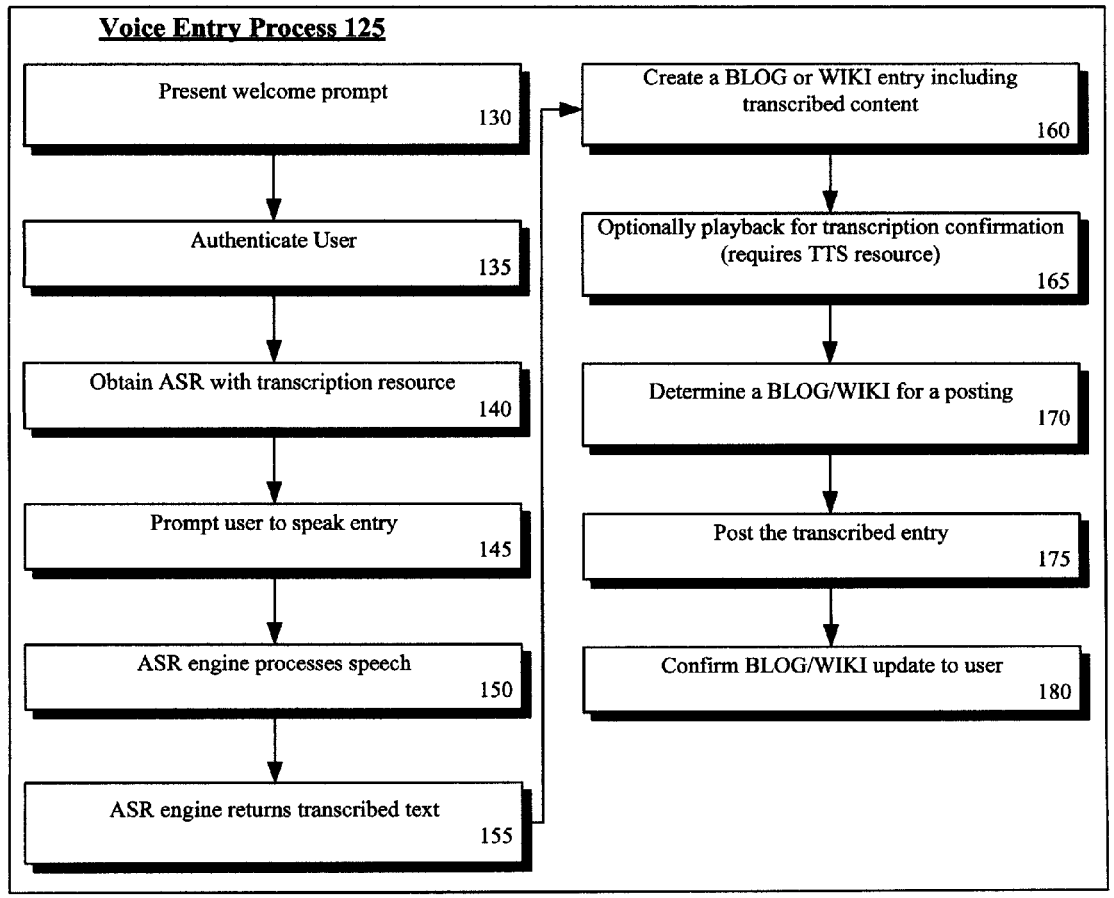
FIG. 1 is a flow diagram illustrating a voice only interface for creating and editing Web 2.0 applications, such as BLOGS and WIKIs, in accordance with an embodiment of the inventive arrangements disclosed herein.

FIG. 1 is a flow diagram illustrating a voice only interface 112 for creating and editing Web 2.0 applications, such as BLOGs and WIKIs, in accordance with an embodiment of the inventive arrangements disclosed herein. In illustrated environment 105, an end-user 110 can use the voice only interface 112 to interact with a voice response system 113, which is linked to a Web 2.0 server 114 and editor 116. The editor 116 can create Web 2.0 applications 115 which result from transcribing user provided speech. The transcription 117, which was speech-to-text converted by speech system 118, can be converted by the Web 2.0 server into suitable syntax for the server 114. For example, when Web 2.0 server 114 is a BLOG server, the transcription 117 can be automatically converted into a BLOG syntax and format before being stored as a BLOG 115. When Web 2.0 server 114 is a WIKI server, the transcription 117 can be automatically converted into WIKI syntax before being stored as a WIKI application 115. In another embodiment, the transcription 117 can be directly converted to a suitable markup, which the Web 2.0 server 114 is able to serve to clients.

It should be noted that the voice-only interface 112 can be a standard telephone interface supporting full user interaction (full duplex) with no hardware device dependencies. The voice response system 113 can be a standard system configured to communicate with the Web 2.0 server 114 using standard Web 2.0 protocols. The user 110 interaction can be carrier independent and can occur through any voice interface 112 via any appropriate computing device, such as a line-based or mobile telephone. Additionally, specifics of Web 2.0 entry 115 creation can be controlled by a configurable Web 2.0 application, served by Web 2.0 server 114. Implementation specifics, such as authentication, user verification, speech system 118 settings, generated entry 115 particulars, confirmation prompting and the like, can be adjusted by adjusting the associated Web 2.0 application. End-users 110 are permitted to configure this Web 2.0 application in a user-specific fashion, as detailed by underlying U.S. patent application Ser. No. 11/765,900 entitled "SPEECH PROCESSING SYSTEM BASED UPON A REPRESENTATIONAL STATE TRANSFER (REST) ARCHITECTURE THAT USES WEB 2.0 CONCEPTS FOR SPEECH RESOURCE INTERFACES"; U.S. patent application Ser. No. 11/765,928 entitled "SPEECH PROCESSING METHOD BASED UPON A REPRESENTATIONAL STATE TRANSFER (REST) ARCHITECTURE THAT USES WEB 2.0 CONCEPTS FOR SPEECH RESOURCE INTERFACES", and/or U.S. patent application Ser. No. 11/765,962 entitled "SPEECH-ENABLED APPLICATION THAT USES WEB 2.0 CONCEPTS TO INTERFACE WITH SPEECH ENGINES".

A sample process flow for a voice entry process 125 for environment 105 is illustrated by steps 130-180. In step 130, an audible welcome prompt can be presented to a user (110) by a voice response system (113). In step 135, the user can be authenticated. After authentication, user specific settings (if any) can be applied. In step 140, automated speech recognition (ASR) resources can be acquired from a speech system (118) along with transcription services. Once a voice channel with the speech system (118) has been established and a transcription process activated, the user (118) can be prompted to speak content for a new Web 2.0 entry (115), as shown by step 145. The user can speak, and the speech can be processed by the ASR engine in step 150. In step 155, the ASR engine can return transcribed text (117). In step 160, a BLOG or a WIKI entry (115) can be created that includes the transcribed content. In step 165, the transcription (117) can be optionally played back for confirmation purposes. Playback can require a text-to-speech (TTS) resource of the speech system 118 to be activated.

In step 170, a BLOG/WIKI can be determined, which the transcribed entry is to be associated with. In one embodiment, a user (110) can be associated with a dated BLOG and step 170 can automatically add an entry for the current date within which the transcribed content is placed. In another embodiment, a user (110) can be prompted to input a pre-existing BLOG/WIKI identifier to which the transcription results are to be appended. The user (110) can also be prompted for a name of a new BLOG/WIKI, which is created for the transcription results. In such a case, the user (110) can also be prompted for information concerning whether the new entry is to be linked to other BLOG entries/WIKI pages. In still another contemplated embodiment, a user (110) can configure a Web 2.0 application associated with the process 125 in a user-specific manner to indicate how transcribed content is to be incorporated into a Web 2.0 entry (115).

In step 175, the transcribed entry can be posted to a Web 2.0 server, which can thereafter serve the entry to Web 2.0 clients. In optional step 180, the user (110) can be asked to confirm the posted content. If the user (110) is unsatisfied with the posting, it can be discarded and the process 125 can be repeated to create a replacement posting. Additionally, the process 125 can be modified to permit a user to edit a portion of a newly created Web 2.0 entry (115) before it is posted in a publicly accessible fashion.

Figure 2:
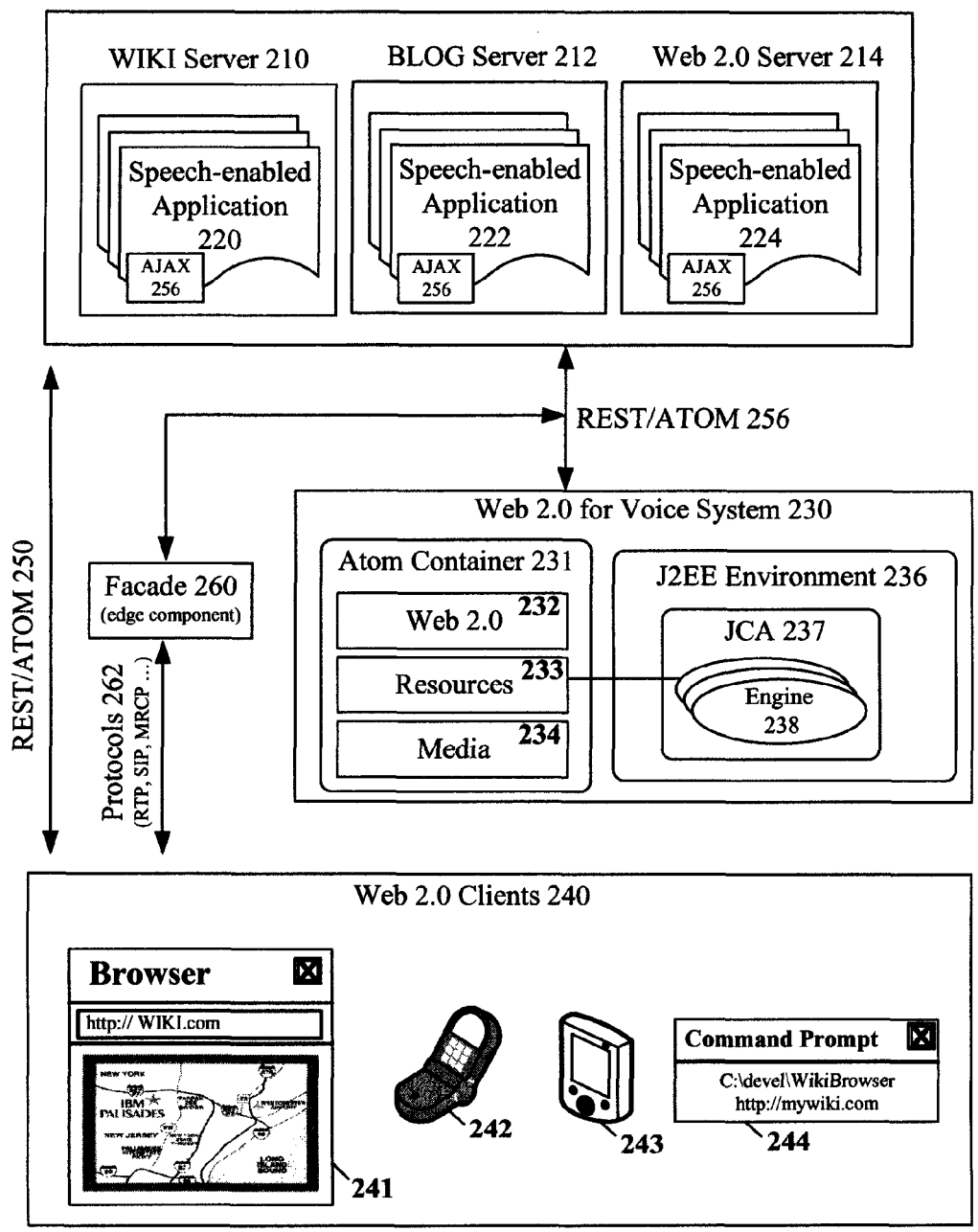
FIG. 2 is a schematic diagram of a system for a Web 2.0 for voice system in accordance with an embodiment of the inventive arrangements disclosed herein.

FIG. 2 is a schematic diagram of a system 200 for a Web 2.0 for voice system 230 in accordance with an embodiment of the inventive arrangements disclosed herein. System 200 can be one contemplated underlying infrastructure for the system and method of FIG. 1.

In system 200, Web 2.0 clients 240 can communicate with Web 2.0 servers 210-214 utilizing a REST/ATOM 250 protocol. The Web 2.0 servers 210-214 can serve one or more speech-enabled applications 220-224, where speech resources are provided by a Web 2.0 for voice system 230. One or more of the speech-enabled applications 220-224 can include AJAX 256 or other JavaScript code. In one embodiment, the AJAX 256 code can be automatically converted from WIKI or other syntax by a transformer of a server 210-214. The servers 210-214 can communicate with each other using a REST/ATOM protocol. For example, the WIKI server 210 can publish WIKI data to BLOG server 212, which organizes and indexes the WIKI data in an Atom Publishing Protocol (APP) compliant format.

Communications between the Web 2.0 servers 210-214 and system 230 can be in accordance with REST/ATOM 256 protocols. Each speech-enabled application 220-224 can be associated with an atom container 231, which specifies Web 2.0 items 232, resources 233, and media 234. One or more resource 233 can correspond to a speech engine 238. REST/ATOM protocols 250, 256 can include HyperText Transfer Protocol (HTTP) and similar protocols that are RESTful by nature as well as an Atom Publishing Protocol (APP) or other protocol that is specifically designed to conform to Representational State Transfer (REST) Architecture principles.

The Web 2.0 clients 240 can be any client capable of interfacing with a Web 2.0 server 210-214. For example, the clients 240 can include a Web or voice browser 241 as well as any other type of interface 244, which executes upon a computing device. The computing device can include a mobile telephone 242, a mobile computer 243, a laptop, a media player, a desktop computer, a two-way radio, a line-based phone, and the like. Unlike conventional speech clients, the clients 240 need not have a speech-specific interface and instead only require a standard Web 2.0 interface. That is, there are no assumptions regarding the client 240 other than an ability to communicate with a Web 2.0 server 210-214 using Web 2.0 conventions.

The Web 2.0 servers 210-214 can be any server that provides Web 2.0 content to clients 240 and that provides speech processing capabilities through the Web 2.0 for voice system 230. The Web 2.0 servers can include a WIKI server 210, a BLOG server 212, a MASHUP server, a FOLKSONOMY server, a social networking server, and any other Web 2.0 server 214.

The Web 2.0 for voice system 230 can utilize Web 2.0 concepts to provide speech capabilities. A server-side interface is established between the voice system 230 and a set of Web 2.0 servers 210-214. Available speech resources can be introspected and discovered via introspection documents, which are one of the Web 2.0 items 232. Introspection can be in accordance with the APP specification or a similar protocol. The ability for dynamic configuration and installation is exposed to the servers 210-214 via the introspection document.

That is, access to Web 2.0 for voice system 230 can be through a Web 2.0 server that allows users (e.g., clients 240) to provide their own customizations/personalizations. Appreciably, use of the APP 256 opens up the application interface to speech resources using Web 2.0, JAVA 2 ENTERPRISE EDITION (J2EE), WEBSPHERE APPLICATION SERVER (WAS), and other conventions rather than being restricted to protocols, such as media resource control protocol (MRCP), real time streaming protocol (RTSP), or real time protocol (RTP).

The Web 2.0 for voice system 230 is an extremely flexible solution that permits users (of clients 240) to customize numerous speech processing elements. Customizable speech processing elements can include speech resource availability, request characteristics, result characteristics, media characteristics, and the like. Speech resource availability can indicate whether a specific type of resource (e.g., ASR, TTS, speaker identification and verification (SIV), VoiceXML interpreter) is available. Request characteristics can refer to characteristics such as language, grammar, voice attributes, gender, rate of speech, and the like. The result characteristics can specify whether results are to be delivered synchronously or asynchronously. Result characteristics can alternatively indicate whether a listener for callback is to be supplied with results. Media characteristics can include input and output characteristics, which can vary from a URI reference to an RTP stream. The media characteristics can specify a codec (e.g., G711), a sample rate (e.g., 8 KHz to 22 KHz), and the like. In one configuration, the speech engines 238 can be provided from a J2EE environment 236, such as a WAS environment. This environment 236 can conform to a J2EE Connector Architecture (JCA).

In one embodiment, a set of additional facades 260 can be utilized on top of Web 2.0 protocols to provide additional interface and protocol 262 options (e.g., MRCP, RTSP, RTP, Session Initiation Protocol (SIP), etc.) to the Web 2.0 for voice system 230. Use of facades 260 can enable legacy access/use of the Web 2.0 for voice system 230. The facades 260 can be designed to segment the protocol 262 from underlying details so that characteristics of the facade 260 do not bleed through to speech implementation details. Functions, such as the WAS 6.1 channel framework or a JCA container 237, can be used to plug-in a protocol, which is not native to the J2EE environment 236. The media component 234 of the container 231 can be used to handle media storage, delivery, and format conversions as necessary. Facades 260 can be used for asynchronous or synchronous protocols 262.

Figure 3:
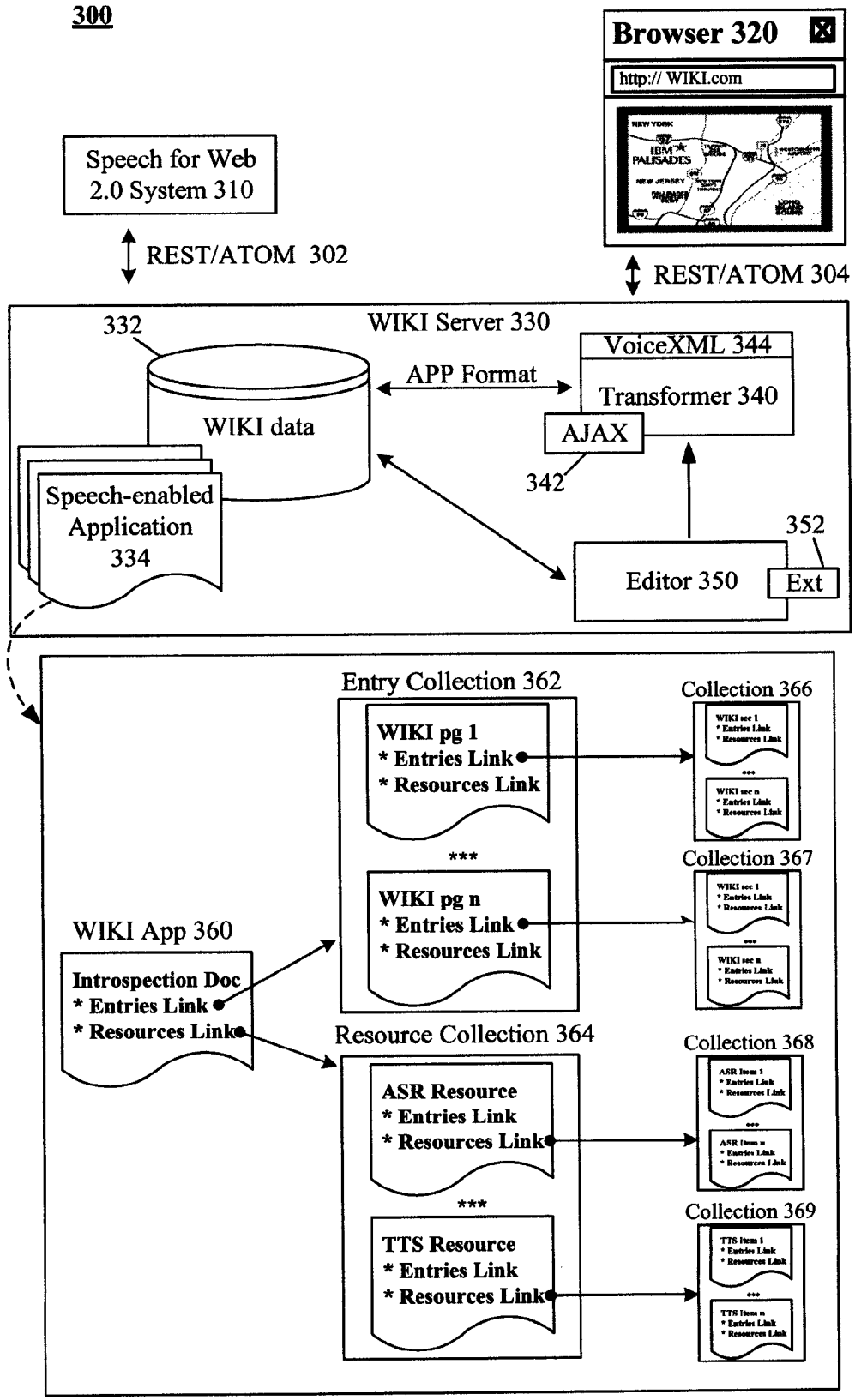
FIG. 3 is a schematic diagram illustrating a WIKI server configured to interact with a speech for Web 2.0 system in accordance with an embodiment of the inventive arrangements disclosed herein.

FIG. 3 is a schematic diagram 300 illustrating a WIKI server 330 configured to interact with a speech for Web 2.0 system 310 in accordance with an embodiment of the inventive arrangements disclosed herein. Although a WIKI server 330 is illustrated, server 330 can be any WEB 2.0 server including, but not limited to, a BLOG server, a MASHUP server, a FOLKSONOMY server, a social networking server, and the like.

In the system 300, a browser 320 can communicate with WIKI server 330 via a REST/ATOM 304 based protocol. The WIKI server 330 can communicate with system 310 via a REST/ATOM 302 based protocol.

The WIKI server 330 can include a data store 332 in which speech-enabled applications 334 are stored. In one embodiment, the speech-enabled applications 334 can be written in a WIKI syntax contained in an APP format. The contents of a speech-enabled application 334 can be accessed using editor 350. The editor 350 can be a standard WIKI editor having a voice plug-in or extensions 352.

The transformer 340 can convert WIKI syntax into standard markup for browsers. In one embodiment, the transformer 340 can be an extension of a conventional transformer that supports HTML and XML. The extended transformer 340 can be enhanced to handle JavaScript, such as AJAX. For example, resource links of application 334 can be converted into AJAX functions by the transformer 340 having an AJAX plug-in 342. The transformer 340 can also include a VoiceXML plug-in 344, which generates VoiceXML markup for voice-only clients.

Each of the speech-enabled WIKI applications 334 can be organized in an APP based format, as shown by WIKI application 360. The application 360 includes an introspection document and a link to an entries collection 362 and a resource collection 364. Each of these collections 362 and 364 can be linked to other collections 366-369. For example, entry collection 362 can be a collection of WIKI pages, which are linked to WIKI page sections (collections 366-367). The resource collection 364 can include speech processing resources, which are linked to resource specifics (collection 368-369).

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for creating and posting Web 2.0 entries comprising:
   establishing a voice-based, real-time telephone communication between a user and a voice response system, wherein the voice response system is configured to communicate with a Web 2.0 server using standard Web 2.0 protocols, wherein the Web 2.0 server serves one or more speech enabled applications, wherein speech resources for the served speech enabled applications are provided by a Web 2.0 for voice system, where communications between the Web 2.0 server and the Web 2.0 for Voice System are in accordance with REST/ATOM protocol, wherein each speech enabled application of the Web 2.0 server is associated with an ATOM container of the Web 2.0 for voice system, wherein each ATOM container specifies Web 2.0 items, resources, and media, where each of the resources correspond to a speech engine of the Web 2.0 for Voice System;
   receiving user speech over the communication and responsively executing at least one of the at least one speech enabled applications of the Web 2.0 server, wherein the at least one speech enabled application is organized in an Atom Publishing Protocol (APP) format, wherein the at least one speech enabled application includes an introspection document and a link to an entries collection and a resource collection, wherein the entries collection and the resource collection are linked to other collections, wherein the entry collection comprises a collection of WIKI pages, and wherein the resource collection comprises speech processing resources, which are linked to resource specifics provided by the Web 2.0 for voice system;
   during execution of the at least one speech enabled application, speech-to-text converting the received speech to produce text, by having the voice response system convey speech to the Web 2.0 server, which communicates with the Web 2.0 Voice system to convert the speech using an automatic speech recognition engine, which is one of the speech engines that corresponds to a resource specified by the ATOM container;
   during execution of the at least one speech enabled application adding the text to a Web 2.0 entry of the Web 2.0 server;
   the Web 2.0 server posting the Web 2.0 entry;

terminating the telephone communication between the user and the voice response system; and the Web 2.0 server serving the posted Web 2.0 entry to Web 2.0 clients, wherein the Web 2.0 clients communicate with the Web 2.0 server using a REST/ATOM protocol.

2. The method of claim 1, wherein the Web 2.0 entry is a WIKI.

3. The method of claim 1, wherein the Web 2.0 entry is a speech-enabled entry able to be served to voice-only clients.

4. The method of claim 1, wherein the Web 2.0 entry is an Atom Publishing Protocol (APP) formatted document comprising an entry collection of at least one entry and a resource collection of at least one resource, wherein end-users are able to introspect, customize, replace, add, re-order, and remove at least a portion of the items in the entry collection and the resource collection via an editing application served by a Web 2.0 server, which serves the Web 2.0 entry.

5. The method of claim 1, further comprising:
authenticating a user after establishing the telephone communication;
determining a set of previously established user-specific settings relating to creating and posting the Web 2.0 entry; and
applying the user-specific settings and performing method steps in accordance with the applied settings.

6. The method of claim 5, further comprising:
a Web 2.0 server that serves the Web 2.0 entry serving a WIKI editing application to a Web browser;
receiving user input through the WIKI editing application; and
using the input to store values for the previously established user-specific settings of the determining step.

7. The method of claim 5, further comprising:
executing a speaker identification and verification routine to identify the user based upon a speech sample provided by the user.

8. The method of claim 1, wherein the receiving, speech-to-text converting, adding, and posting steps are in accordance with a set of programmatic instructions stored in a machine readable medium, said set of programmatic instructions together comprising a speech-enabled Web 2.0 application, which is served by a Web 2.0 server to the voice response system.

9. The method of claim 8, wherein the speech-enabled Web 2.0 application comprises a plurality of linked markup documents served by the Web 2.0 server to standard voice interpreters, wherein at least one of the linked markup documents is a resource document for a speech resource associated with a speech engine, which adds a speech processing capability to the speech-enabled Web 2.0 application, wherein the speech resource is associated with an automatic speech recognition resource.

10. The method of claim 9, wherein JavaScript functions of the speech-enabled Web 2.0 application establish communication channels between the voice response system and a speech processing system in which the speech engine resides.

11. The method of claim 9, wherein the Web 2.0 server is configured so that end-users are able to introspect, customize, replace, add, re-order, and remove at least a portion of the linked markup documents.

12. A system for creating Web 2.0 entries via a telephone interface comprising:
a Web 2.0 server configured to serve at least one application to remotely located clients, said application comprising an introspection document, an entry collection of linked entries, and a resource collection of resources;

an automated response system configured to interact with remotely located users over a telephone communication channel, wherein the automated response system is configured to communicate with the Web 2.0 server using standard Web 2.0 protocols, wherein the Web 2.0 server serves one or more speech enabled applications, wherein each of the one or more speech enabled applications is organized in an Atom Publishing Protocol (APP) format, wherein the at least one speech enabled application includes an introspection document and a link to an entries collection and a resource collection, wherein the entries collection and the resource collection are linked to other collections, wherein the entry collection comprises a collection of WIKI pages, and wherein the resource collection comprises speech processing resources, which are linked to resource specifics provided by a Web 2.0 for voice system; and a server-side speech system, which is the Web 2.0 for Voice system, remotely located from the Web 2.0 server configured to speech-to-text convert speech input to the automated response system in accordance with voice markup of a speech-enabled application served to the automated response system by the Web 2.0 server, wherein the converted speech input is used to create a Web 2.0 entry, which is served by a Web 2.0 server, wherein speech resources for the served speech enabled applications are provided by a Web 2.0 for voice system, where communications between the Web 2.0 server and the Web 2.0 for Voice System are in accordance with REST/ATOM protocol, wherein each speech enabled application of the Web 2.0 server is associated with an ATOM container of the Web 2.0 for voice system, wherein each ATOM container specifies Web 2.0 items, resources, and media, where each of the resources correspond to a speech engine of the Web 2.0 for Voice System.

13. The system of claim 12, further comprising:
a transformer of the Web 2.0 server configured to convert WIKI syntax into standard markup for browsers, wherein the transformer supports HTML and XML, wherein the transformer comprises a VoiceXML plugin, which generates VoiceXML for voice-only clients.

14. The system of claim 12, wherein the Web 2.0 server speech-enabled application served to the automated response system is a speech-enabled WIKI application.

15. The system of claim 12, wherein the created Web 2.0 entry is an Atom Publishing Protocol (APP) formatted document comprising an entry collection of at least one entry and a resource collection of at least one resource, wherein end-users are able to introspect, customize, replace, add, re-order, and remove at least a portion of the items in the entry collection and the resource collection via an editing application served by the Web 2.0 server that serves the created Web 2.0 entry.

16. A method for creating a Web 2.0 entry comprising:
establishing a voice-based, real-time communication between a user and a voice response system, wherein the voice response system is configured to communicate with a Web 2.0 server using standard Web 2.0 protocols, wherein the Web 2.0 server serves one or more speech enabled applications, wherein speech resources for the served speech enabled applications are provided by a Web 2.0 for voice system, where communications between the Web 2.0 server and the Web 2.0 for Voice System are in accordance with REST/ATOM protocol, wherein each speech enabled application of the Web 2.0 server is associated with an ATOM container of the Web 2.0 for voice system, wherein each ATOM container specifies Web 2.0 items, resources, and media, where each of the resources correspond to a speech engine of the Web 2.0 for Voice System, wherein each of the one or more speech enabled applications is organized in an Atom Publishing Protocol (APP) format, wherein the at least one speech enabled application includes an introspection document and a link to an entries collection and a resource collection, wherein the entries collection and the resource collection are linked to other collections, wherein the entry collection comprises a collection of WIKI pages, and wherein the resource collection comprises speech processing resources, which are linked to resource specifics provided by the Web 2.0 for voice system;

the voice response system executing voice markup code stored in a machine readable media, which was served from the Web 2.0 server;

audibly presenting a welcome prompt to the user;

authenticating the user;

obtaining an automatic speech recognition resource from a remotely located speech system in accordance with instructions of the executing voice markup code;

prompting the user to speak an entry;

conveying resulting spoken input to the obtained automatic speech recognition resource;

receiving transcribed text from the speech recognition resource;

adding the transcribed text to a Web 2.0 entry of the Web 2.0 server;

the Web 2.0 server posting the Web 2.0 entry;

terminating the voice-based communication; and the Web 2.0 server serving the posted Web 2.0 entry to Web 2.0 clients.

17. The method of claim 16, further comprising:

determining a set of previously established user-specific settings relating to creating and posting the Web 2.0 entry, wherein the settings are determined by querying a setting data store based upon user identifying information obtained in the authenticating step; and applying the user-specific settings and performing method steps in accordance with the applied settings.

\* \* \* \* \*